United States Patent
Mogi

(10) Patent No.: US 7,194,987 B2
(45) Date of Patent: Mar. 27, 2007

(54) INTERNAL COMBUSTION ENGINE DRIVEN WITH CHANGE-OVER OF COMPRESSION RATIO, AIR-FUEL RATIO, AND BOOST STATUS

(75) Inventor: Kazuhisa Mogi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/745,544

(22) Filed: Dec. 29, 2003

(65) Prior Publication Data

US 2004/0134464 A1 Jul. 15, 2004

(30) Foreign Application Priority Data

Jan. 9, 2003 (JP) ........................................ 2003-002933

(51) Int. Cl.
*F02D 15/04* (2006.01)

(52) U.S. Cl. .................................. 123/48 C; 123/78 C
(58) Field of Classification Search ..... 123/48 R–48 D, 123/78 R–78 F, 559.1, 556
See application file for complete search history.

(56) References Cited

U.S. PATENT DOCUMENTS

| | | | | |
|---|---|---|---|---|
| 4,202,300 A | * | 5/1980 | Skay | 123/432 |
| 4,286,552 A | * | 9/1981 | Tsutsumi | 123/48 AA |
| 4,619,236 A | * | 10/1986 | Okada et al. | 123/406.3 |
| 4,827,882 A | * | 5/1989 | Paul et al. | 123/292 |
| 5,201,907 A | * | 4/1993 | Hitomi et al. | 123/48 D |
| 6,520,127 B1 | * | 2/2003 | Thieleke et al. | 123/46 R |
| 6,553,949 B1 | * | 4/2003 | Kolmanovsky et al. | 123/48 B |
| 6,834,636 B2 | * | 12/2004 | Thomas et al. | 123/241 |

FOREIGN PATENT DOCUMENTS

| | | |
|---|---|---|
| JP | A-60-216037 | 10/1985 |
| JP | A 63-120820 | 5/1988 |
| JP | A 63-159642 | 7/1988 |

* cited by examiner

*Primary Examiner*—Marguerite McMahon
(74) *Attorney, Agent, or Firm*—Oliff & Berridge, PLC

(57) ABSTRACT

With an increase in torque demand, the internal combustion engine of the invention successively changes over a combination of a compression ratio, an air-fuel ratio, and a boost status of an air-fuel mixture from (1) settings of a high compression ratio, a lean air-fuel ratio, and a non-boosting state, (2) settings of the high compression ratio, the lean air-fuel ratio, and a boosting state, (3) settings of a low compression ratio, the lean air-fuel ratio, and the boosting state, to (4) settings of the low compression ratio, a stoichiometric air-fuel ratio, and the boosting state. The changeover strategy desirably widens a driving area of the internal combustion engine at the high compression ratio of a high thermal efficiency or at the lean air-fuel ratio. Under the condition of a large torque demand, the internal combustion engine is driven with boosting the stoichiometric air-fuel mixture at the low compression ratio to output a sufficiently large torque. The arrangement of the invention adequately changes over the compression ratio, the air-fuel ratio, and the boost status of the internal combustion engine, thus simultaneously enhancing the thermal efficiency and the maximum output of the internal combustion engine.

8 Claims, 12 Drawing Sheets

INTERNAL COMBUSTION ENGINE DRIVEN WITH CHANGE-OVER OF COMPRESSION RATIO, AIR-FUEL RATIO, AND BOOST STATUS

BACKGROUND OF THE INVENTION

1. Field of the Invention

The present invention relates to a technique of adequately changing over the compression ratio, the air-fuel ratio, and the boost status of an internal combustion engine.

2. Description of the Related Art

An internal combustion engine, which has a small in size but is capable of outputting a relatively large power, is widely used as power sources of various transportations including automobiles, ships and boats, and aircraft and as power source of various stationary equipment and machinery. The internal combustion engine compresses the air-fuel mixture, makes the compressed air-fuel mixture subjected to combustion in a combustion chamber, and converts the pressure of the combustion into a mechanical power to be output. Diverse techniques have been proposed as the results intensive research and development to enhance the conversion efficiency into the mechanical power (the thermal efficiency) and the maximum output of the internal combustion engine.

A method of varying the compression ratio is one technique developed to enhance the thermal efficiency of the internal combustion engine. As is generally known, the internal combustion engine has a theoretically optimum compression ratio, which gives the highest thermal efficiency. In the actual internal combustion engine, however, an increase in compression ratio raises the potential for the occurrence of abnormal combustion called knocking. In order to prevent the occurrence of such knocking, a smaller value than the theoretically optimum value is generally set to the compression ratio. The potential for the occurrence of knocking depends upon the driving conditions of the internal combustion engine. The technique of varying the compression ratio close to the optimum value according to the driving conditions in a knocking-free range allows for an improvement in thermal efficiency of the internal combustion engine.

Boosting is a technique developed to increase the maximum output of the internal combustion engine. The boosting technique pressurizes the air and supplies the pressurized air to the internal combustion engine. This ensures supply of a large quantity of the air and allows for combustion of a large quantity of the fuel at once, thus increasing the output of the internal combustion engine.

The method of varying the compression ratio with boosting can simultaneously enhance the maximum output and the thermal efficiency of the internal combustion engine. Boosting, however, raises the potential for the occurrence of knocking. Execution of boosting under the condition of the high compression ratio is thus not desirable, because of the higher potential for the occurrence of knocking. One technique has been proposed to adequately execute boosting while changing over the compression ratio by taking into account these factors (for example, see Japanese Patent Laid-Open Gazette No. 63-120830).

Another proposed technique to improve the thermal efficiency of the internal combustion engine makes a lean air-fuel mixture, which has a smaller rate of the fuel to the air, subjected to combustion. Still another proposed technique changes-over the air-fuel ratio of the air-fuel mixture with boosting to simultaneously enhance the maximum output and the thermal efficiency of the internal combustion engine (for example, see Japanese Patent Laid-Open Gazette No. 63-159642).

No method, however, has been proposed to attain simultaneous and adequate changeover of the settings of the boost status, the compression ratio, and the air-fuel ratio, so as to effectively enhance the thermal efficiency and the maximum output of the internal combustion engine.

SUMMARY OF THE INVENTION

The object of the invention is thus to provide a technique that adequately changes over the settings of the boost state, the compression ratio, and the air-fuel ratio, so as to efficiently and simultaneously enhance the thermal efficiency and the maximum output of the internal combustion engine.

In order to attain at least part of the above and the other related objects, a first internal combustion engine of the invention and a corresponding first control method of the internal combustion successively change over a combination of a compression ratio, an air-fuel ratio, and a boost status, with an increase in torque demand, from (1) a first control area that represents settings of a high compression ratio, a lean air-fuel ratio, and a non-boosting state, (2) a second control area that represents settings of the high compression ratio, the lean air-fuel ratio, and a boosting state, (3) a third control area that represents settings of a low compression ratio, the lean air-fuel ratio, and the boosting state, to (4) a fourth control area that represents settings of the low compression ratio, a stoichiometric air-fuel ratio, and the boosting state. For example, in response to a large torque demand in the driving state of the internal combustion engine with the air-fuel mixture of the high compression ratio and the lean air-fuel ratio under the non-boosting condition, boosting starts to increase the output torque of the internal combustion engine. This arrangement enables the internal combustion engine to be driven without changing the high compression ratio and the lean air-fuel ratio of the air-fuel mixture and thereby desirably keeps the high thermal efficiency of the internal combustion engine.

In response to a further increase in torque demand in the driving state of the internal combustion engine with the air-fuel mixture of the high compression ratio and the lean air-fuel ratio under the boosting state, the control procedure lowers the compression ratio and raises a boost pressure to increase the output torque. The lowered compression ratio effectively prevents the occurrence of knocking under the condition of the raised boost pressure. This arrangement thus ensures output of a large torque from the internal combustion engine, while keeping the thermal efficiency at a relatively high level. The internal combustion engine is driven with the air-fuel mixture of the lean air-fuel ratio. This desirably minimizes the decrease in thermal efficiency.

The setting of the compression ratio is changed over, while the air-fuel ratio of the air-fuel mixture is kept in the lean state. The air-fuel mixture of the lean air-fuel mixture has the lower potential for the occurrence of knocking than the air-fuel mixture of the stoichiometric air-fuel ratio. Even in the case of a slight delay in changeover of the compression ratio, this control procedure effectively prevents the occurrence of knocking.

In the second control area, the output torque of the internal combustion engine may be controlled by regulating an opening of a throttle valve or by varying the boost pressure. In the third control area, the output torque of the internal combustion engine may be controlled by varying the boost pressure of the air-fuel mixture at the low compression ratio.

This arrangement adequately controls the output torque of the internal combustion engine by boosting the air-fuel mixture of the high compression ratio and the lean air-fuel ratio.

When the variation in boost pressure is applied to control the output torque of the internal combustion engine in the third control area, the compression ratio of the internal combustion engine may be lowered with an increase in boost pressure.

In general, the higher boost pressure and the higher compression ratio increase the potential for the occurrence of knocking in the internal combustion engine. The decrease in compression ratio under the condition of the high boost pressure thus desirably raises the boost pressure to increase the output torque of the internal combustion engine, while effectively preventing the occurrence of knocking.

At least part of the above and the other related objects are also attained by a second internal combustion engine of the invention and a corresponding second control method of the internal combustion engine. When the torque demand exceeds a preset second threshold value, which is greater than a preset first threshold value in the driving state of the internal combustion engine with the settings of the high compression ratio, the lean air-fuel ratio, and the boosting state, the second internal combustion engine of the invention and the corresponding second control method lower the compression ratio and raise the boost pressure to increase the output torque of the internal combustion engine, while keeping the lean air-fuel ratio of the air-fuel mixture.

The lowered compression ratio with an increase in boost pressure desirably increases the output torque of the internal combustion engine without raising the potential for the occurrence of knocking. The internal combustion engine is driven without lowering the thermal efficiency and the torque due to the occurrence of knocking. The arrangement thus keeps the thermal efficiency of the internal combustion engine at a sufficiently high level. The compression ratio is changed over, while the internal combustion engine is driven with the air-fuel mixture of the lean air-fuel ratio. This arrangement effectively prevents the occurrence of knocking even in the case of a slight delay in changeover of the compression ratio.

When the torque demand exceeds a preset third threshold value, which is greater than the preset second threshold value, in the driving state of the internal combustion engine with the settings of the low compression ratio, the lean air-fuel ratio, and the boosting state, the second internal combustion engine of the invention and the corresponding second control method may change the air-fuel ratio of the air-fuel mixture to the stoichiometric state to increase the output torque of the internal combustion engine.

This arrangement desirably ensures a further increase in output torque of the internal combustion engine, even under the conditions of a sufficiently high boost pressure and the low compression ratio.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
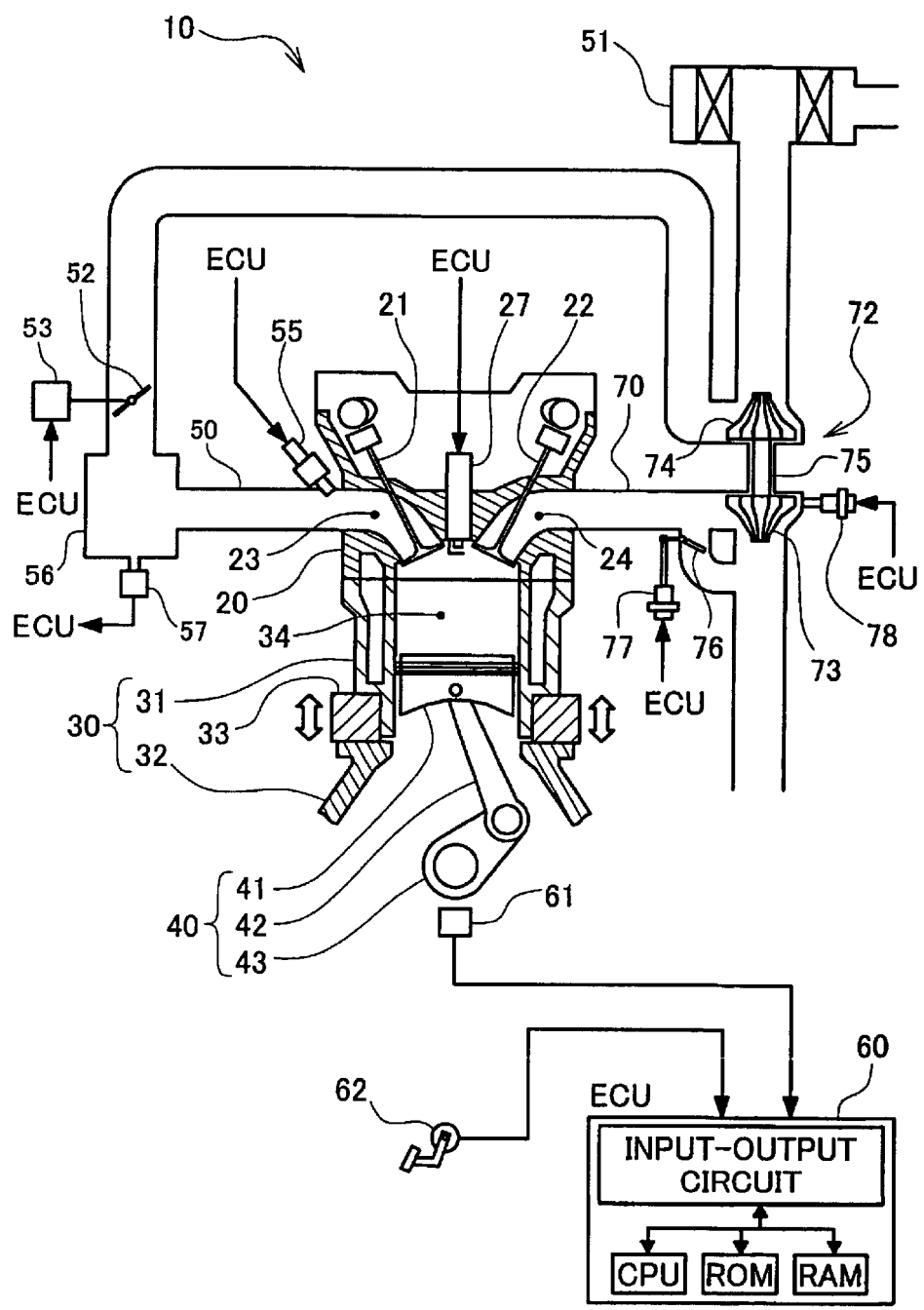
FIG. 1 schematically illustrates the structure of an engine in one embodiment of the invention.

One embodiment of the invention is discussed below in the following sequence:

A. System Structure
B. Outline of Engine Control
C. Changeover of Settings for Control
D. Modifications A. System Structure FIG. 1 schematically illustrates the structure of an engine 10 in one embodiment of the invention. As illustrated, the engine 10 mainly includes a cylinder head 20, a cylinder block assembly 30, a main moving assembly 40, an intake conduit 50, an exhaust conduit 70, a booster mechanism 72, and an engine control unit (hereafter referred to as ECU) 60.

The cylinder block assembly 30 has an upper block 31 with the cylinder head 20 mounted thereon and a lower block 32 to receive the main moving assembly 40 therein. An actuator 33 is interposed between the upper block 31 and the lower block 32. The actuator 33 is driven to vertically move the upper block 31 relative to the lower block 32. A tubular cylinder 34 is formed in the upper block 31.

The main moving assembly 40 has a piston 41 disposed inside the cylinder 34, a crankshaft 43 rotating inside the lower block 32, and a connecting rod 42 connecting the piston 41 with the crankshaft 43. The piston 41, the connecting rod 42, and the crankshaft 43 constitute a crank mechanism. Rotation of the crankshaft 43 slides up and down the piston 41 in the cylinder 34, while the vertical sliding motion of the piston 41 rotates the crankshaft 43 in the lower block 32. Attachment of the cylinder head 20 to the cylinder block assembly 30 gives a space defined by a lower face of the cylinder head 20 (a face coming into contact with the upper block 31), the cylinder 34, and the piston 41. This space functions as a combustion chamber. The upward movement of the upper block 31 by actuation of the actuator 33 moves the cylinder head 20 up to increase the inner volume of the combustion chamber, thus lowering the compression ratio. The downward movement of the cylinder head 20 with the upper block 31, on the other hand, reduces the inner volume of the combustion chamber to heighten the compression ratio.

The cylinder head 20 has an intake port 23 to take the air into the combustion chamber and an exhaust port 24 to discharge the gaseous exhaust from the combustion chamber. An intake valve 21 is set at an opening of the intake port 23 to the combustion chamber, and an exhaust valve 22 is set at an opening of the exhaust port 24 to the combustion chamber. The intake valve 21 and the exhaust valve 22 are driven by respective cam mechanisms with the vertical motions of the piston 41. The on-off control of the intake valve 21 and the exhaust valve 22 at respective adequate timings in synchronism with the motions of the piston 41 takes the air into the combustion chamber and discharges the exhaust gas from the combustion chamber. The cylinder head 20 has an ignition plug 27, which ignites the air-fuel mixture with a spark in the combustion chamber.

The cylinder head 20 is connected with the intake conduit 50 to lead the flow of the air to the intake port 23 and with the exhaust conduit 70 to lead the flow of the gaseous exhaust out of the exhaust port 24. The booster mechanism 72 is located in the middle of the exhaust conduit 70. The booster mechanism 72 has a turbine 73 located in the exhaust conduit 70, a compressor 74 located in the intake conduit 50, and a shaft 75 connecting the turbine 73 with the compressor 74. The flow of the gaseous exhaust discharged from the combustion chamber rotates the turbine 73 of the booster mechanism 72. The rotation of the turbine 73 triggers rotation of the compressor 74 via the shaft 75 to pressurize the air in the intake conduit 50 and feed the pressurized air to the combustion chamber.

The booster mechanism 72 of this embodiment has an actuator 78 to vary an opening area, through which the gaseous exhaust is flown into the turbine 73 (hereafter referred to as turbine opening area). The variation in turbine opening area regulates the pressure increase of the air (the boost pressure). A bypass valve called a waste gate valve 76 is disposed on the upstream of the turbine 73. A waste gate actuator 77 is used to adjust the opening of the waste gate valve 76. The adjustment of the opening varies the rate of the gaseous exhaust bypassing the turbine 73 and thereby regulates the boost pressure.

An air cleaner 51 is provided on an upstream end of the intake conduit 50. The supply of the air goes through the air cleaner 51 for removal of dust and foreign substances, is pressurized by the compressor 74, and is flown into the combustion chamber via the intake port 23. A throttle valve 52 and a fuel injection valve 55 are arranged in the intake conduit 50. The opening of the throttle valve 52 is regulated by an electric actuator 53 to control the quantity of the air flown into the combustion chamber. A surge tank 56 is located in the downstream of the throttle valve 52 to absorb a pressure variation in the intake conduit 50. An intake pressure sensor 57 is attached to the surge tank 56 to measure the inner pressure of the surge tank 56. The supply of the fuel is injected from the fuel injection valve 55 toward the intake port 23. The injected fuel spray is partly vaporized in the intake port 23. The residual portion of the fuel spray is flown into the combustion chamber in the atomized state or in the liquid film state and is vaporized and mixed with the air to form the air-fuel mixture in the combustion chamber.

The ECU 60 is constructed by a microcomputer including a central processing unit (CPU), a ROM, a RAM, and input and output circuits, which are mutually connected via a bus. The ECU 60 receives required information from a crank angle sensor 61 attached to the crankshaft 43, an accelerator opening sensor 62 built in an accelerator pedal, and the intake pressure sensor 57 attached to the surge tank 56, and controls actuation of the ignition plug 27, the fuel injection valve 55, and the electric 53 based on the input information, so as to control the operations of the whole engine 10. The control may also utilize, as a piece of the input information, the observed opening of the throttle valve 52, which is measured by a throttle opening sensor built in the electric actuator 53.

B. Outline of Engine Control

Figure 2:
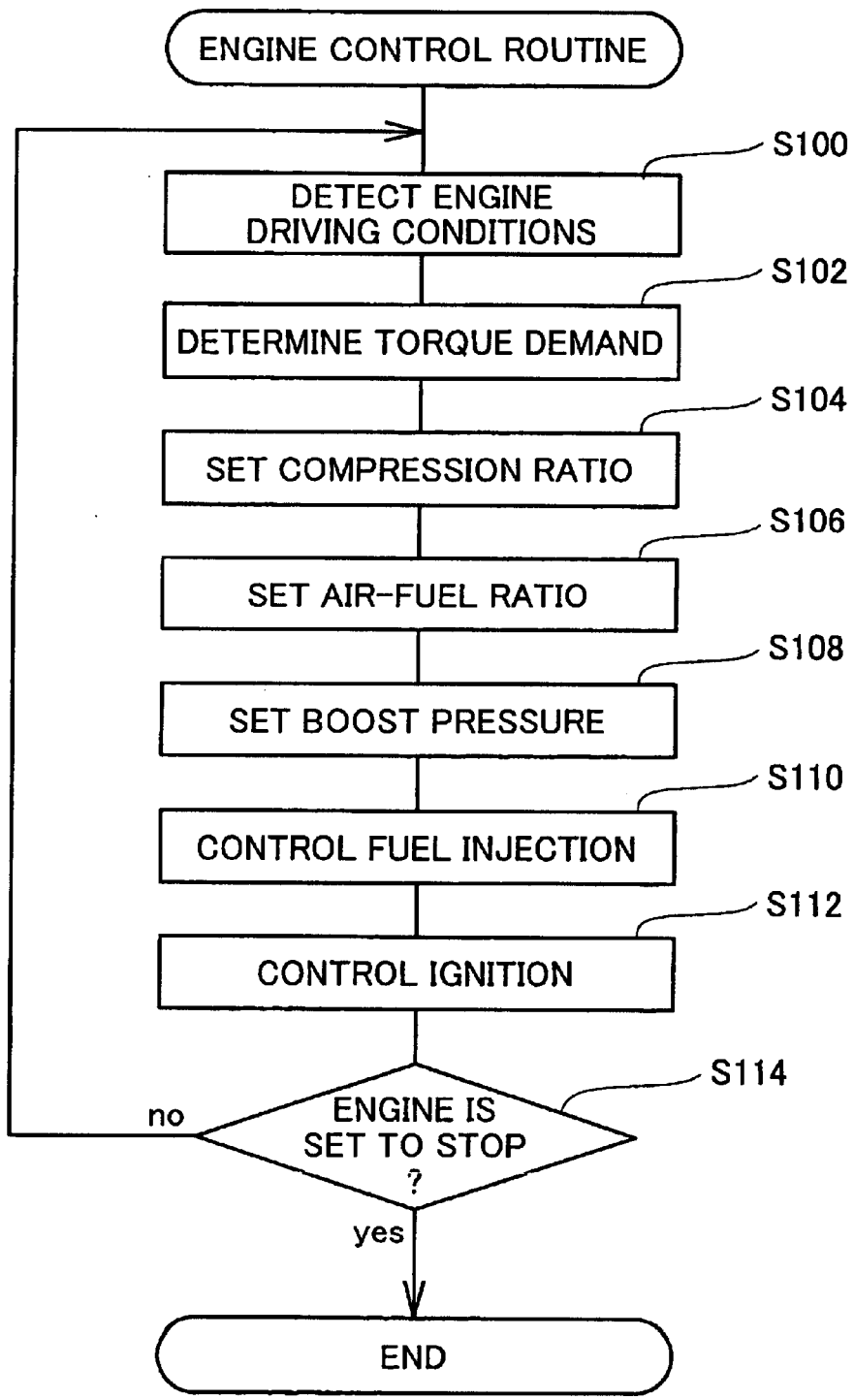
FIG. 2 is a flowchart showing an engine control routine executed in the embodiment.

The description regards the operations of the engine 10 having the structure discussed above with reference to the flowchart of FIG. 2. The flowchart of FIG. 2 shows a control flow of the operations of the engine 10 by the ECU 60.

When the engine control routine starts, the ECU 60 first detects the driving conditions of the engine 10 (step S100). For example, the driving conditions of the engine 10 are an engine revolution speed Ne and an accelerator opening qac. The procedure of the embodiment calculates the engine revolution speed Ne from the output of the crank angle sensor 61 and receives the accelerator opening qac measured by the accelerator opening sensor 62.

The ECU 60 determines a torque demand, based on the input driving conditions of the engine 10 (step S102). The operator of the engine steps on the accelerator pedal to increase the output torque of the engine, while stepping off the accelerator pedal to decrease the output torque of the engine. The operational amount of the accelerator pedal is thus expected to reflect the operators torque demand to the engine. The torque demand is accordingly computable from the accelerator opening qac. The embodiment specifies in advance variations in torque demand against the accelerator opening qac with regard to respective engine revolution speeds Ne and stores the specified variations in the form of a map. The concrete procedure of step S102 refers to this map to specify the torque demand.

Figure 3:
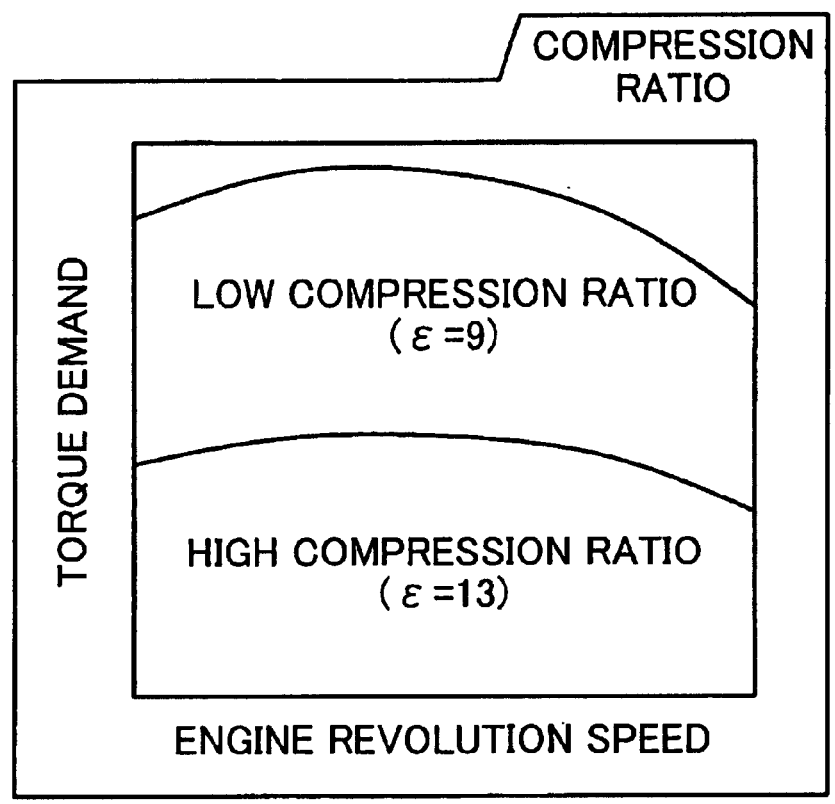
FIG. 3 conceptually shows a map of settings of the compression ratio relative to the engine revolution speed and the torque demand.

After determination of the torque demand, the ECU 60 specifies a setting of the compression ratio (step S104). A map of settings of the compression ratio relative to the engine revolution speed Ne and the torque demand as parameters is set and stored in advance in the RAM of the ECU 60. FIG. 3 shows a map of settings of the compression ratio stored in the RAM as an example. In the engine 10 of this embodiment, the compression ratio may be changed over between two levels, a high compression ratio and a low compression ratio. The map of FIG. 3 accordingly has two settings of the compression ratio, a high compression ratio (e=13) and a low compression ratio (e=9). The changeover of the compression ratio is not restricted to the two stages, but the compression ratio may be changed over in a greater number of stages. The concrete procedure of step S104 refers to this map to specify the adequate setting of the compression ratio according to the input driving conditions and drives the actuator 33 incorporated in the cylinder block assembly 30 to set the compression ratio of the engine 10.

Subsequent to the setting of the compression ratio, the ECU 60 sets a control target of the air-fuel ratio (step S106). The air-fuel ratio is an index representing the ratio of the air to the fuel included in the air-fuel mixture and is defined as division of the weight of the air contained in the air-fuel mixture by the weight of the fuel. The air-fuel mixture containing the air and the fuel at a specific ratio ensuring just enough and sufficient combustion is called the 'stoichiometric air-fuel mixture'. The air-fuel ratio of the stoichiometric air-fuel mixture is varied according to the composition of the fuel, but is about 14.7 in the case of gasoline fuel. The air-fuel mixture having the smaller rate of the fuel to the air is called the 'lean air-fuel mixture'. The decrease in rate of the fuel to the air (that is, the leaner of the air-fuel mixture) leads to the higher air-fuel ratio. The air-fuel mixture having the greater rate of the fuel to the air is called the 'rich air-fuel mixture'. The increase in rate of the fuel to the air (that is, the richer of the air-fuel mixture) leads to the lower air-fuel ratio. As mentioned above with reference to FIG. 1, in the engine 10 of the embodiment, the fuel is injected from the fuel injection valve 55. The air-fuel ratio of the air-fuel mixture is regulated by varying the amount of fuel injection to the amount of the air taken into the combustion chamber. The control process accordingly sets the control target of the air-fuel ratio at step S106 in the flowchart of FIG. 2.

Figure 4:
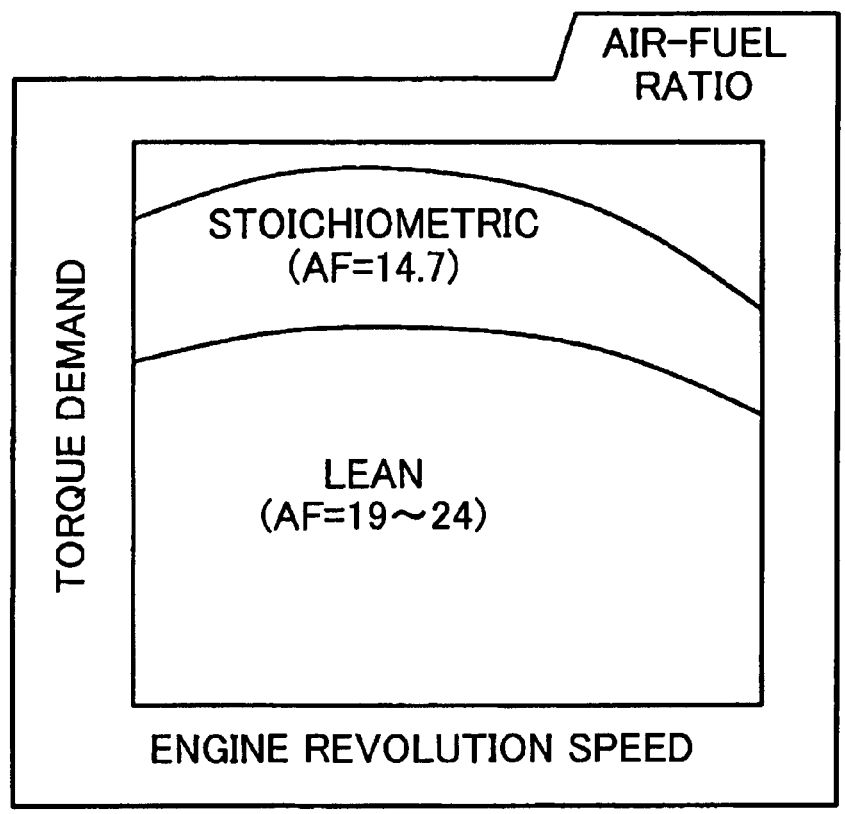
FIG. 4 conceptually shows a map of settings of the control target of the air-fuel ratio relative to the engine revolution speed and the torque demand.

The process of setting the control target of the air-fuel ratio refers to a map stored in the RAM of the ECU 60. The map sets the control target of the air fuel ratio relative to the engine revolution speed and the torque demand as parameters. FIG. 4 shows a map of settings of the control target of the air-fuel ratio stored in the RAM as an example. As shown in the map, the control target of the air-fuel ratio is mainly divided into two areas, a stoichiometric area of the stoichiometric air-fuel ratio and a lean area of the lean air-fuel ratio. In the case of a large torque demand, the stoichiometric air-fuel mixture is subjected to combustion for output of a sufficiently large torque. Otherwise the lean air-fuel mixture is subjected to combustion for the enhanced fuel consumption rate. In the lean area, the adequate setting of the air-fuel ratio for the smooth drive of the engine 10 is selected in a range of 19 to 24 according to the combination of the engine revolution speed and the torque demand.

Subsequent to the setting of the air-fuel ratio, the ECU 60 sets a control target of the boost pressure (step S108). As described previously with reference to FIG. 1, the booster mechanism 72 of the embodiment regulates the boost pressure by driving the actuator 78 to vary the turbine opening area or by driving the waste gate actuator 77 to adjust the opening of the waste gate valve 76. The control process accordingly sets the control target of the boost pressure at step S108 in the flowchart of FIG. 2. Like the compression ratio and the air-fuel ratio discussed above, settings of the control target of the boost pressure relative to the engine revolution speed and the torque demand as parameters are stored in the form of a map in the RAM of the ECU 60.

Figure 5:
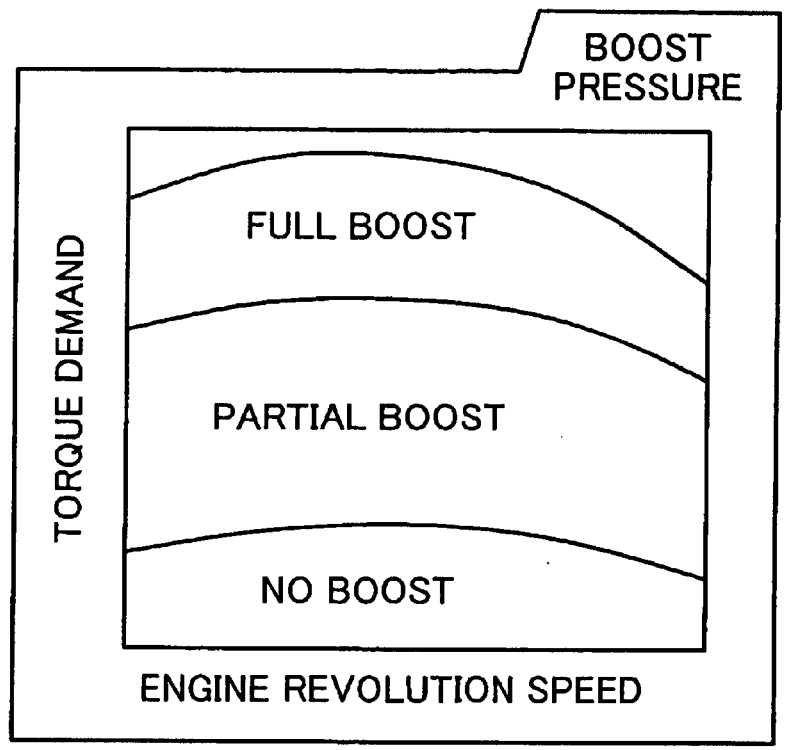
FIG. 5 conceptually shows a map of settings of the control target of the boost status relative to the engine revolution speed and the torque demand.

FIG. 5 shows a map of settings of the control target of the boost pressure stored in the RAM as an example. As shown in the map, the engine 10 of the embodiment is driven without boosting in an area of small torque demand. Setting the waste gate valve 76 of FIG. 1 at a full-open position leads all the flow of the gaseous exhaust to the bypass and thereby drives the engine 10 without boosting. Partial boosting starts when the torque demand reaches a certain level. The waste gate valve 76 is gradually turned in a closing direction with an increase in torque demand to raise the rate of the gaseous exhaust led to the turbine 73. Such control gives the adequate setting of the boost pressure corresponding to the torque demand. The little flow of the gaseous exhaust led to the turbine 73 lowers the efficiency of boosting. In order to avoid such an undesirable decrease in efficiency of boosting, the turbine opening area is reduced at the low flow of the gaseous exhaust led to the turbine 73. The turbine opening area is widened with an increase in flow of the gaseous exhaust. The waste gate valve 76 is gradually turned in the closing direction with an increase in torque demand and eventually reaches its full closed position, where all the flow of the gaseous exhaust is flown into the turbine 73. This is the full boost status. The concrete procedure of step S108 refers to the map shown in FIG. 5 and selects the adequate setting of the boost status for control of the engine 10.

The ECU 60 subsequently starts fuel injection control (step S110). The fuel injection control specifies the amount of the air taken into the combustion chamber and causes a preset amount of the fuel for attaining a desired air-fuel ratio to be injected from the fuel injection valve 55 at an adequate timing. The procedure of this embodiment calculates the amount of the air taken into the combustion chamber from the inner pressure of the intake conduit 50 measured by the intake pressure sensor 57. In one modified structure, an air flow sensor may be provided in the intake conduit 50 to measure the amount of air sucked in by the engine 10. In a simpler modification, variations in amount of intake air are measured in advance against the engine revolution speed and the opening of the throttle valve 52 as parameters and are stored in the form of a map. The procedure refers to this map and specifies the amount of intake air corresponding to the measurements of these parameters. The fuel injection control then determines the amount of the fuel according to the specified amount of intake air to attain the target air-fuel ratio set at step S106. As mentioned previously, the air-fuel ratio is defined as division of the weight of the air by the weight of the fuel. The amount of the fuel is thus calculable from the specified amount of intake air and the setting of the target air-fuel ratio. The concrete procedure of step S110 actuates the fuel injection valve 55 at a preset timing for a certain time period corresponding to the amount of the fuel thus determined. The air-fuel mixture having the target air-fuel ratio is accordingly formed in the combustion chamber.

On conclusion of the fuel injection control, the ECU 60 starts ignition control (step S112). The ignition control makes the ignition plug 27 emit a spark at an adequate timing to ignite the air-fuel mixture formed in the combustion chamber. The ignition timing is set according to a map stored in the ROM of the ECU 60.

Figure 6:
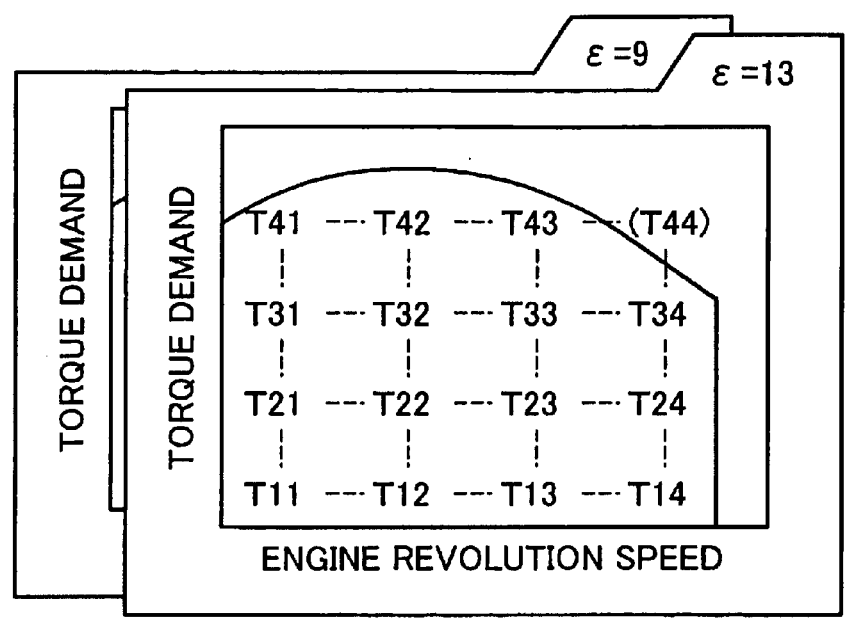
FIG. 6 conceptually shows a map of settings of the ignition timing relative to the engine revolution speed and the torque demand at the respective compression ratios.

FIG. 6 conceptually shows adequate settings of the ignition timing relative to the engine revolution speed and the torque demand as parameters in the form of a map. As mentioned previously, the engine 10 of the embodiment is capable of changing over the compression ratio between the high compression ratio and the low compression ratio. The adequate ignition timing depends upon the compression ratio. Maps of the ignition timing are thus provided separately for the high compression ratio (e=13) and for the low compression ratio (e=9), as shown in FIG. 6. The concrete procedure of step S112 in the flowchart of FIG. 2 refers to the map corresponding to the current setting of the compression ratio and specifies the adequate timing by interpolation. In the case where the compression ratio is changed over in a greater number of stages, instead of the high-low two stages, separate maps may be provided for the respective settings of the compression ratio. Otherwise the ignition timing at the current setting of the compression ratio may be specified by interpolation between different settings of the compression ratio.

The ignition control specifies the adequate ignition timing according to the driving conditions of the engine 10 and actuates the ignition plug 27 at the specified ignition timing based on the output of the crank angle sensor 61 to ignite the air-fuel mixture in the combustion chamber. The combustion of the air-fuel mixture abruptly raises the inner pressure of the combustion chamber to press the piston 41 down. The press-down force of the piston 41 is transmitted to the crankshaft 43 via the connecting rod 42 and is converted into a rotational force by the crank mechanism to be output as the power.

The ECU 60 subsequently checks whether the engine 10 has been set to stop (step S114). When the engine 10 has not yet been set to stop, the ECU 60 returns to step S100 to repeat the series of processing. When the engine 10 has been set to stop, on the other hand, the ECU 60 terminates the engine control routine. The engine 10 is thus driven according to the control routine of FIG. 2 under control of the ECU 60 to output the power corresponding to the operator's settings.

C. Changeover of Settings for Control

The engine 10 of the embodiment is driven with changeover of the compression ratio, the air-fuel ratio, and the boost status as described above. This enables the engine 10 to be driven with high efficiency by simultaneously enhancing the thermal efficiency and the maximum output, as described below with reference to FIG. 7(a) and FIG. 7(b).

Figure 7A:
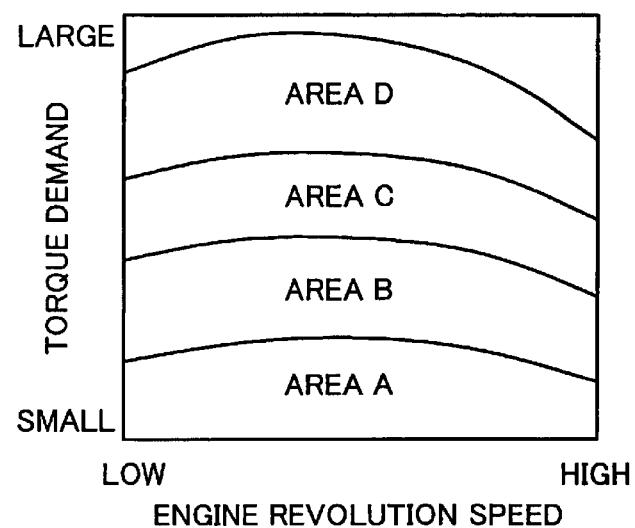
FIGS. 7(a) and 7(b) conceptually show changeover of the settings of the compression ratio, the air-fuel ratio, and the boost status in the embodiment.
Figure 7B:
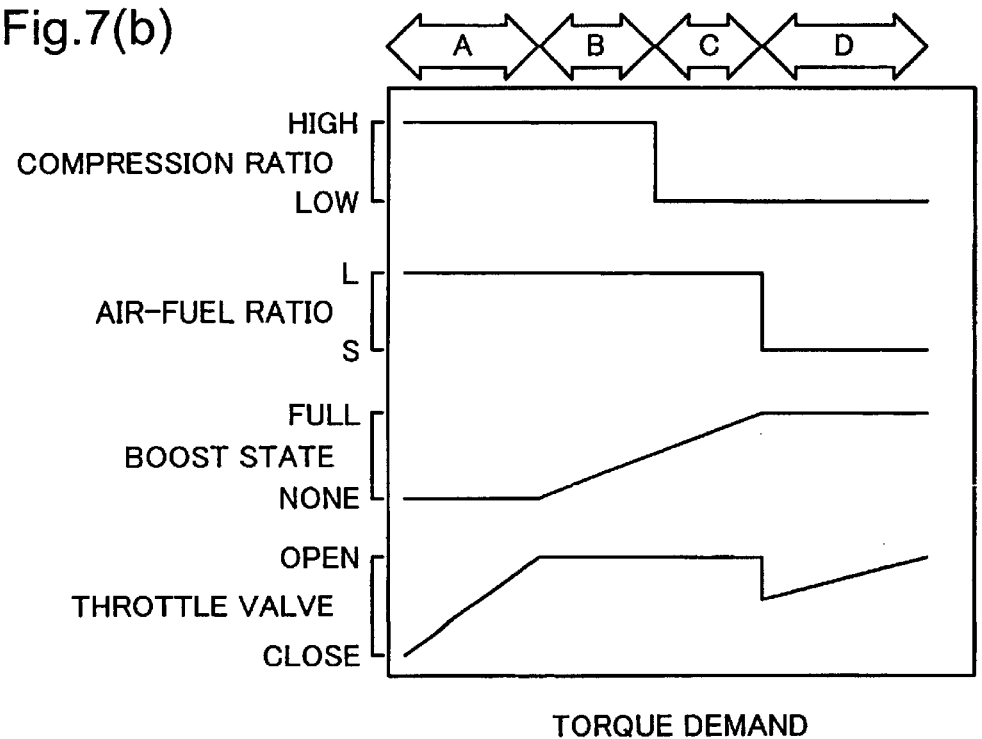

FIG. 7(a) and FIG. 7(b) conceptually show changeover of the compression ratio, the air-fuel ratio, and the boost status to drive the engine 10 with high efficiency by simultaneously enhancing the thermal efficiency and the maximum output. As described above with reference to FIGS. 3 through 5, the adequate settings of the compression ratio, the air-fuel ratio, and the boost status of the engine 10 are changed over according to the combination of the engine revolution speed and the torque demand. These settings are rearranged by focusing on the changeover of the compression ratio, the air-fuel ratio, and the boost status to be classified into four areas A through D as shown in FIG. 7(a). In the area A, the engine 10 is driven at the high compression ratio, at the lean air-fuel ratio, and in the non-boosting state. The difference between the area B and the area A is that the boosting state is set in the area B. Namely the engine 10 in the area B is driven at the high compression ratio, at the lean air-fuel ratio, and in the boosting state. The difference between the area C and the area B is that the low compression ratio is set in the area C. Namely the engine 10 in the area C is driven at the low compression ratio, at the lean air-fuel ratio, and in the boosting state. The difference between the area D and the area C is that the stoichiometric air-fuel ratio is set in the area D. Namely the engine 10 in the area D is driven at the low compression ratio, at the stoichiometric air-fuel ratio, and in the boosting state. The following description regards changeover of the settings of the compression ratio, the air-fuel ratio, and the boost status with an increase in torque demand.

FIG. 7(b) conceptually shows changeover of the settings of the compression ratio, the air-fuel ratio, and the boost status of the engine 10 with an increase in torque demand at a fixed engine revolution speed. Under the condition of a small torque demand, the engine 10 is driven with the settings of the area A (that is, at the high compression ratio, at the lean air-fuel ratio, and in the non-boosting state). With a variation in torque demand, the opening of the throttle valve 52 is adjusted to regulate the torque output of the engine 10. In this illustrated example, with a rise of the torque demand, the opening of the throttle valve 52 is increased as shown in FIG. 7(b).

Boosting starts when the opening of the throttle valve 52 reaches a preset level. The preset level may be an opening at the full-open position of the throttle valve 52 or may be an opening with some margin to the full-open position. The latter setting with some margin to the full-open position is, however, preferable, since the throttle valve 52 is set to its full-open position to immediately raise the output torque of the engine 10 in the case of some emergency. The start of boosting changes over the driving state of the engine 10 from the area A (that is, at the high compression ratio, at the lean air-fuel ratio, and in the non-boosting state) to the area B (that is, at the high compression ratio, at the lean air-fuel ratio, and in the boosting state). In the area B, with a variation in torque demand, the torque output of the engine 10 is regulated by adjusting the boost pressure. As mentioned previously, in the engine 10 of the embodiment, the boost pressure is adjustable by regulating the opening of the waste gate valve 76 and by regulating the turbine opening area. In this illustrated example, with a rise of the torque demand, the boost pressure is increased as shown in FIG. 7(b).

In the settings of FIG. 7(b), the opening of the throttle valve 52 is kept constant in the area B. The torque output of the engine 10 may be regulated by additionally adjusting the opening of the throttle valve 52. For example, when the changeover from the non-boosting state to the boosting state causes an excess output torque of the engine 10, the opening of the throttle valve 52 may slightly be decreased to relieve the abrupt change of the torque.

In the area B, the engine 10 is driven at the high compression ratio. The increase in boost pressure raises the potential for the occurrence of knocking. When the torque demand reaches a preset level, the compression ratio is thus changed over to the low compression ratio, which has the lower potential for the occurrence of knocking. In the structure of changing over the compression ratio in a greater number of stages, the compression ratio may be changed over to the lowest level at once or may be lowered in steps. The changeover of the compression ratio from the high compression ratio to the low compression ratio changes the driving state of the engine 10 from the settings of the area B to the settings of the area C. As in the case of the area B, with a variation in torque demand, the torque output of the engine 10 is regulated by adjusting the boost pressure in the area C. In the area C, however, the compression ratio has been changed over to the low compression ratio. The boost pressure can thus be raised to its full boost status without increasing the potential for the occurrence of knocking. In the settings of FIG. 7(b), the opening of the throttle valve 52 is kept constant over the areas B and C. In the case where the output torque of the engine 10 varies due to the changeover of the compression ratio, the opening of the throttle valve 52 may be regulated to absorb the variation of the torque output.

When the boost pressure reaches a sufficiently high level, the adjustment of the boost pressure can not meet a further increase in torque demand. The air-fuel ratio of the air-fuel mixture is thus changed from the lean state to the stoichiometric state. The stoichiometric air-fuel mixture has a higher concentration of the fuel than the lean air-fuel mixture. Changeover of the air-fuel ratio of the air-fuel mixture from the lean state to the stoichiometric state thus ensures output of a greater torque. As discussed previously with reference to the map of FIG. 4, in the engine 10 of the embodiment, the lean air-fuel mixture has the air fuel ratio in the range of 19 to 24. The changeover of the air-fuel ratio from the lean state to the stoichiometric state means that the stoichiometric air-fuel ratio approximately equal to 14.7 is attained at once. When the air-fuel ratio is closer to the stoichiometric state, the concentration of nitrogen oxides included in the gaseous exhaust increases. Reduction of the nitrogen oxides included in the gaseous exhaust is, however, difficult when the air-fuel mixture is lean. It is accordingly desirable either to drive the engine with the leanest possible air-fuel mixture or to drive the engine with the stoichiometric air-fuel mixture, which ensures easy reduction of the nitrogen oxides by means of a three-way catalyst.

The drastic changeover of the air-fuel ratio abruptly increases the output torque of the engine 10. Simultaneously with the changeover of the air-fuel ratio, the opening of the throttle valve 52 is decreased to prevent such an abrupt change of the output torque as shown in FIG. 7(b). In the illustration of FIG. 7(b), the air-fuel ratio is kept constant over the areas A, B, and C. This is, however, to avoid the complexity of illustration and to simplify the non-essential characteristics for the better understanding. In the actual state, the air-fuel ratio is varied in the range of 19 to 24 according to the map of FIG. 5.

The changeover of the air-fuel ratio from the lean state to the stoichiometric state changes the driving state of the engine 10 from the settings of the area C (that is, at the low compression ratio, at the lean air-fuel ratio, and in the boosting state) to the settings of the area D (that is, at the low compression ratio, at the stoichiometric air-fuel ratio, and in the boosting state). In the area D, with a variation in torque demand, the opening of the throttle valve 52 is regulated to adjust the output torque of the engine 10. As shown in FIG. 7(b), the opening of the throttle valve 52 gradually increases with an increase in torque demand. When the throttle valve 52 reaches its full-open state in the area D, the engine 10 attains its maximum output.

As described above, in the engine 10 of the embodiment, when the opening of the throttle valve 52 approaches to the full-open state in the area A (that is, at the high compression ratio, at the lean air-fuel mixture, and in the non-boosting state), boosting starts to meet an increase in torque demand. This arrangement ensures an increase in output torque without lowering the thermal efficiency of the engine 10 as described later.

In the engine 10 of the embodiment, the air-fuel mixture is kept to have the lean air-fuel ratio during a shift from the area B to the area C with the changeover of the compression ratio from the high compression ratio to the low compression ratio. In general, the leaner air-fuel mixture has the lower potential for the occurrence of knocking. The changeover of the compression ratio in the lean state of the air-fuel mixture does not raise the potential for the occurrence of knocking, even when the compression ratio is slightly deviated from the appropriate setting.

Under the condition of a large torque demand, the engine is driven with boosting the stoichiometric air-fuel mixture of the low compression ratio to a sufficiently high level. This ensures output of a sufficiently large torque without increasing the potential for the occurrence of knocking.

The engine 10 can be driven at the highest efficiency by changing over the settings of the compression ratio, the air-fuel ratio, and the boost status. This is described in detail with reference to FIG. 8.

Figure 8:
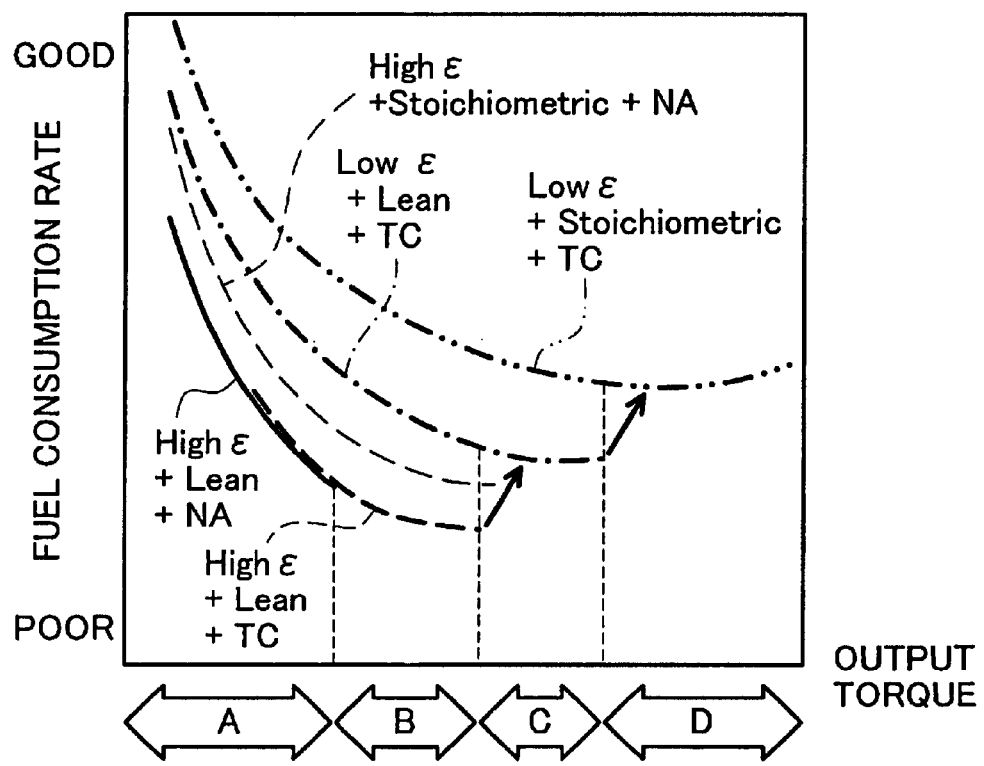
FIG. 8 explains the reason why the thermal efficiency and the maximum output are enhanced simultaneously by changing over the settings of the compression ratio, the air-fuel ratio, and the boost status in the embodiment.

FIG. 8 conceptually shows the measurement results of the fuel consumption rate against the output torque of the engine with regard to the respective combinations of the compression ratio, the air-fuel ratio, and the boost status. Under the condition of a fixed output torque, the higher thermal efficiency of the engine gives the smaller fuel consumption rate. In the graph of FIG. 8, a curve of solid line represents a variation in fuel consumption rate against the output torque of the engine, which is driven with the settings of 'the high compression ratio, the lean air-fuel ratio, and the non-boosting state'. In this graph, the symbol 'NA' represents the non-boosting state and the symbol 'TC' represents the boosting state.

As shown by the solid curve, the thermal efficiency of the engine is maximized when the engine is driven with the settings of the high compression ratio, the lean air-fuel ratio, and the non-boosting state. Driving the engine at the lean air-fuel ratio without boosting, however, allows for output of only a small torque. The possible torque output range under these driving conditions is restricted to the area A. The engine 10 of the embodiment starts boosting to output a greater torque exceeding the range A, as described above.

In the graph of FIG. 8, a curve of thick broken line represents a variation in fuel consumption rate against the output torque of the engine, which is driven with the settings of 'the high compression ratio, the lean air-fuel ratio, and the boosting state'. As seen from the graph, execution or non-execution of boosting hardly affects the fuel consumption rate. Namely execution of boosting raises the output torque, while maintaining the high thermal efficiency. For the purpose of comparison, a curve of thin broken line representing a variation in fuel consumption rate against the output torque of the engine, which is driven with the settings of 'the high compression ratio, the stoichiometric air-fuel ratio, and the non-boosting state' is also given in the graph of FIG. 8. The curve of thick broken line is located below the curve of thin broken line. This clearly shows that driving the engine with the settings of 'the high compression ratio, the lean air-fuel ratio, and the boosting state' expressed by the curve of thick broken line ensures the higher thermal efficiency of the engine in the area B, compared with driving the engine with the settings of 'the high compression ratio, the stoichiometric air-fuel ratio, and the non-boosting state' expressed by the curve of thin broken line.

The increase in boost pressure to a certain level under the condition of the high compression ratio triggers the occurrence of knocking. In order to prevent knocking, the compression ratio is set lower to give a margin to the occurrence of knocking, prior to a further increase of the boost pressure. A curve of one-dot chain line in FIG. 8 represents a variation in fuel consumption rate against the output torque of the engine, which is driven with the settings of 'the low compression ratio, the lean air-fuel ratio, and the boosting state'. The curve of one-dot chain line is located above the curve of thick broken line. This shows a decrease in thermal efficiency with a decrease in compression ratio. Execution of boosting at the high compression ratio expressed as the curve of thick broken line, however, causes knocking and there is a certain limit to the increase in output torque. In the area C, driving the engine following the curve of one-dot chain line thus maximizes the thermal efficiency of the engine.

Execution of boosting at the low compression ratio sufficiently heightens the boost pressure to output a significantly large torque. The changeover of the air-fuel ratio from the lean state to the stoichiometric state ensures a further increase of the output torque. A curve of two-dot chain line in FIG. 8 represents a variation in fuel consumption rate against the output torque of the engine, which is driven with the settings of 'the low compression ratio, the stoichiometric air-fuel ratio, and the boosting state'.

As described above, with an increase in torque to be output from the engine 10, the engine 10 of the embodiment successively changes over the driving state from the settings of 'the high compression ratio, the lean air-fuel ratio, and the non-boosting state', the settings of 'the high compression ratio, the lean air-fuel ratio, and the boosting state', to the settings of 'the low compression ratio, the lean air-fuel ratio, and the boosting state'. This enables the engine 10 to be driven under the condition of the least fuel consumption rate (that is, the highest thermal efficiency) in the respective areas A through C. In the area D, the driving state of the engine 10 is eventually changed over to the settings of 'the low compression ratio, the stoichiometric air-fuel ratio, and the boosting state), which ensures a maximum torque output. This arrangement assures output of a sufficiently large torque according to the requirements, while maintaining the high thermal efficiency of the engine 10.

D. Modifications

The embodiment described above may be modified and changed in various ways. Some examples of possible modification are briefly explained. The description especially regards the differences from the above embodiment.

(1) First Modified Example

Figure 9A:
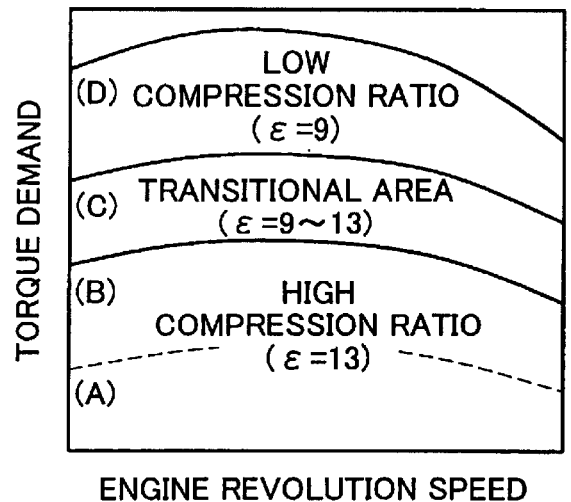
FIGS. 9(a) and 9(b) conceptually show changeover of the settings of the compression ratio, the air-fuel ratio, and the boost status in a first modified example.

In the structure of the embodiment, the compression ratio is changed over between the high compression ratio (e=13) and the low compression ratio (e=9) as shown in FIG. 3. There may be an area of continuous variation in compression ratio between the area of the low compression ratio and the area of the high compression ratio, as shown in a first modified example of FIGS. 9(a) and 9(b). FIG. 9(a) shows a map of settings of the compression ratio in the first modified example. There is a transitional area of continuous variation in compression ratio between the area of the high compression ratio and the area of the low compression ratio in the first modified example.

Figure 9B:
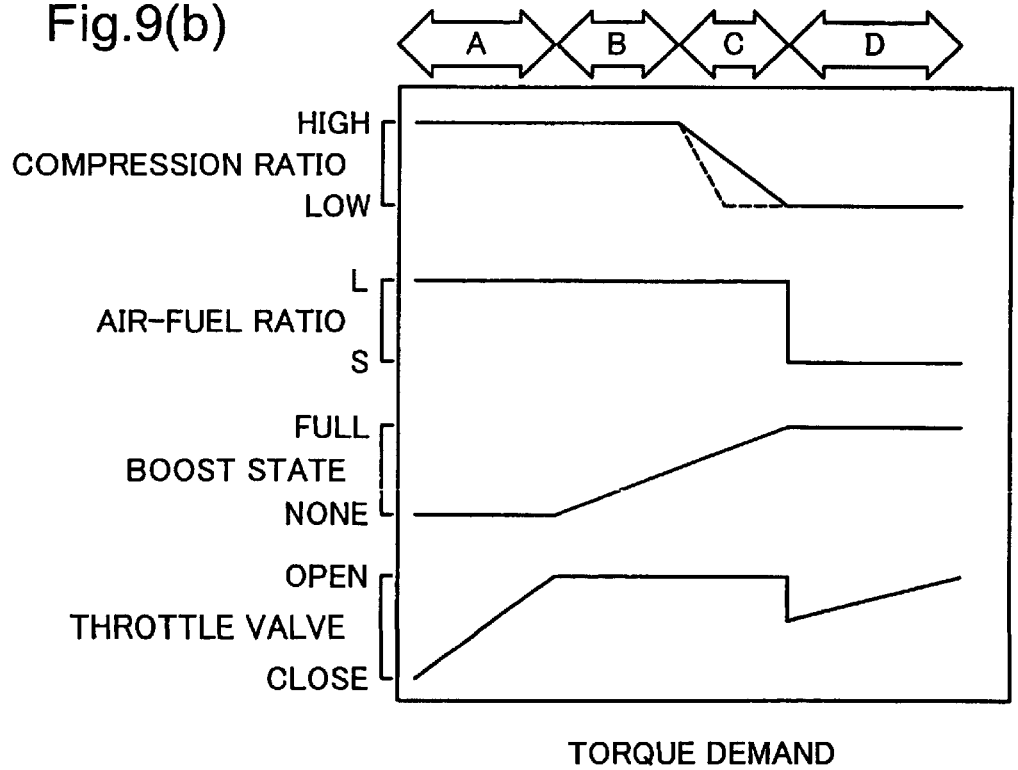

FIG. 9(b) conceptually shows changeover of the compression ratio, the air-fuel ratio, and the boost status with a gradual increase in torque demand. In this first modified example, the compression ratio is changed over according to the map of FIG. 9(a), while the air-fuel ratio and the boost status are changed over respectively according to the maps of FIGS. 4 and 5.

As clearly understood from the comparison between FIGS. 7(a), 7(b), 9(a) and 9(b), the compression ratio is abruptly changed from the high compression ratio to the low compression ratio with a shift from the area B to the area C in the embodiment of FIGS. 7(a) and 7(b), whereas the compression ratio is gradually changed from the high compression ratio to the low compression ratio in the transitional area C in the modified example of FIGS. 9(a) and 9(b). The gradual decrease in compression ratio in the area C increases the boost pressure to raise the output torque of the engine 10, while effectively preventing the occurrence of knocking. The compression ratio in the area C set in the first modified example is higher than the compression ratio in the area C set in the embodiment discussed above. This advantageously leads to enhancement of the thermal efficiency of the engine 10. The advantage of the embodiment discussed above is, on the other hand, the simpler changeover control of the compression ratio.

In the first modified example discussed above, the whole area C functions as the transitional area to gradually vary the compression ratio from the high compression ratio to the low compression ratio. The transitional area may not be the whole area C but may be part of the area C to attain a quicker change of the compression ratio. This quicker change of the compression ratio is shown by the broken line in FIG. 9(b). This arrangement adequately sets the rate of variation in compression ratio and thus enables the compression ratio to be kept at the higher level in the area C without any complicated control, while effectively preventing the occurrence of knocking.

(2) Second Modified Example

The embodiment discussed above uses the maps of the compression ratio, the air-fuel ratio, and the boost status. The compression ratio, the air-fuel ratio, and the boost status are individually changed according to the settings of the respective maps. Namely the respective areas A through D are not explicitly identified in the changeover process of the compression ratio, the air-fuel ratio, or the boost status. The respective areas A through D are simply identified as the result of the control. The procedure of one possible modification changes over the settings of the compression ratio, the air-fuel ratio, and the boost status, while enabling explicit discrimination among the respective areas A through D.

Figure 10:
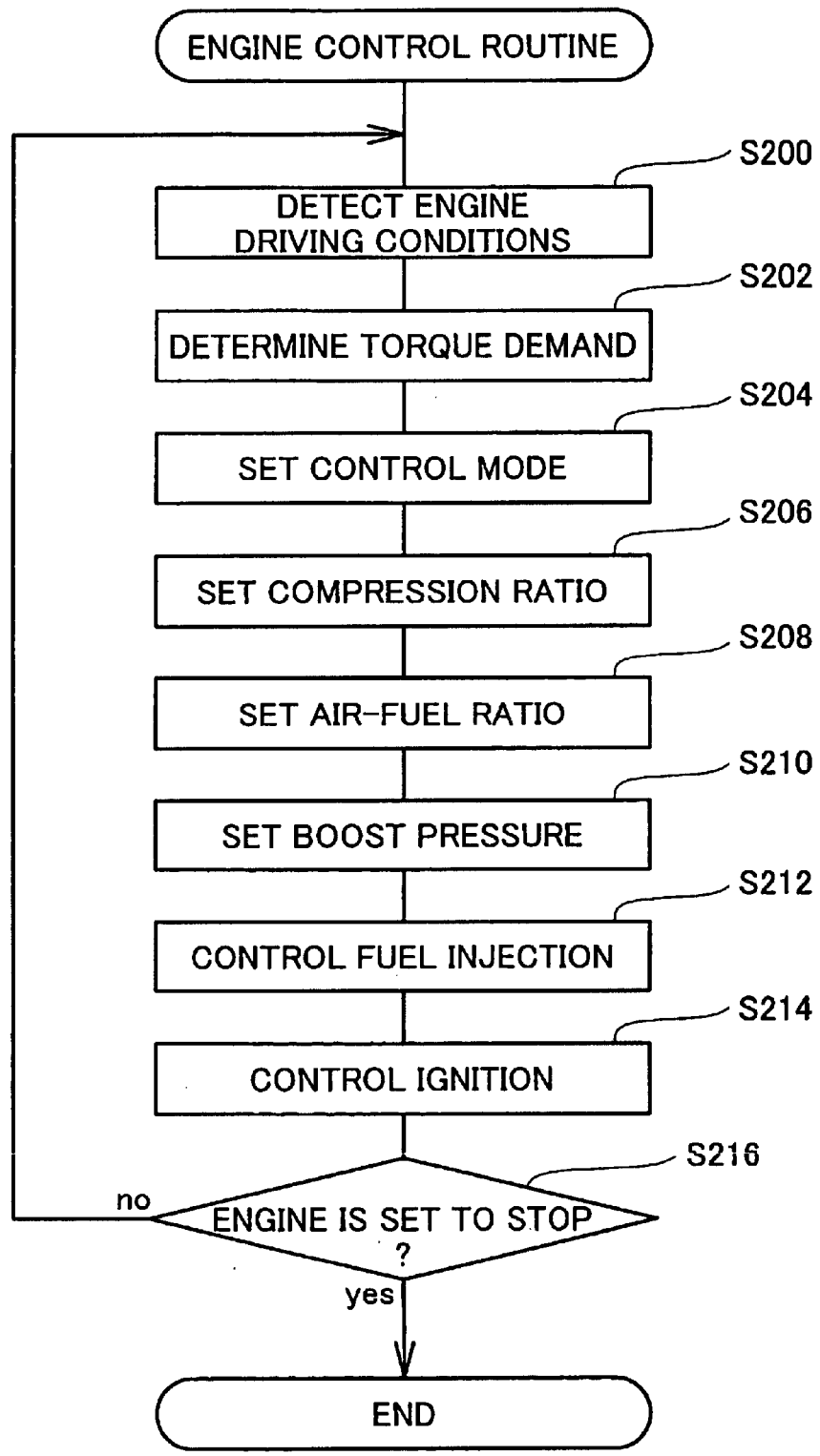
FIG. 10 is a flowchart showing an engine control routine executed in a second modified example.

FIG. 10 is a flowchart showing an engine control routine executed in the second modified example. The main difference from the engine control routine of the embodiment shown in the flowchart of FIG. 2 is setting a control mode. The following description mainly regards the difference from the engine control routine of the embodiment.

The ECU 60 detects the engine driving conditions (step S200) and determines the torque demand based on the results of the detection (step S202). The processing of steps S200 and S202 is identical with the processing of steps S100 and S102 in the flowchart of FIG. 2 and is not specifically described here.

Figure 11:
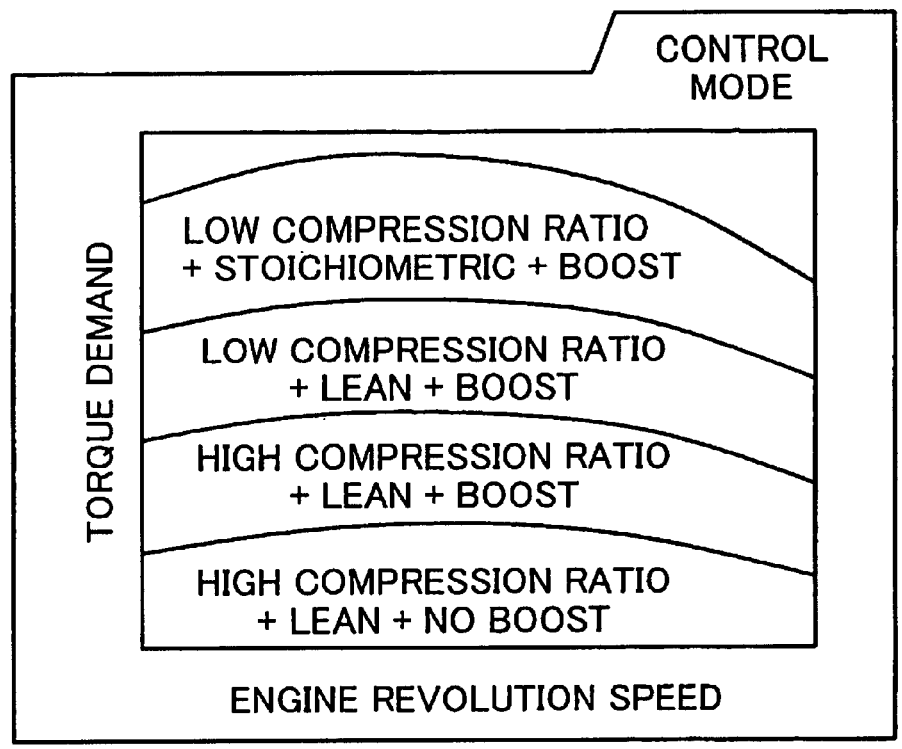
FIG. 11 conceptually shows a map referred to when a control mode is set in the second modified example.

In the engine control routine of the second modified example, the ECU 60 subsequently sets a control mode of the engine 10 (step S204). The concrete procedure of step S204 refers to a map stored in the RAM of the ECU 60 to set the control mode of the engine 10. FIG. 11 conceptually shows a map referred to when the control mode is set in the engine control routine of the second modified example. The map specifies control modes representing the setting of 'the high compression ratio, the lean air-fuel ratio, and the non-boosting state', the setting of 'the high compression ratio, the lean air-fuel ratio, and the boosting state', the setting of 'the low compression ratio, the lean air-fuel ratio, and the boosting state', and the setting of 'the low compression ratio, the stoichiometric air-fuel ratio, and the boosting state'. The engine control process refers to the map of FIG. 11 and selects the control mode corresponding to the detected engine revolution speed and the determined torque demand at step S204 in the flowchart of FIG. 10.

After setting the control mode, the ECU 60 sets the compression ratio, the air-fuel ratio, and the boost pressure in the selected control mode (steps S206 to S210). For example, in the control mode representing the settings of 'the high compression ratio, the lean air-fuel ratio, and the boosting state', the procedure refers to a map of the lean air-furl ratio to set the target control of the air-fuel ratio and refers to a map of the boosting state to set the target control of the boost pressure. The compression ratio is changed over between the two stages, that is, the high compression ratio and the low compression ratio. Specification of the control mode thus automatically determines the compression ratio. In the structure of changing over the compression ratio in a greater number or stages or continuously, the procedure may refer to a map of the high compression ratio to set the control target of the compression ratio.

On completion of setting the compression ratio, the air-fuel ratio, and the boost pressure, the ECU 60 carries out the fuel injection control and the ignition control (steps S212 and S214), in the same manner as the engine control routine of the embodiment shown in the flowchart of FIG. 2. The ECU 60 then determines whether the engine 10 has been set to stop (step S216). When the engine 10 has not yet been set to stop at step S216, the ECU 60 returns to step S200 to repeat the series of processing. The series of processing is repeated until the engine 10 has been set to stop. In response to detection of the engine stop at step S216, the ECU 60 terminates the engine control routine of FIG. 10.

As described above, the procedure of the second modified example sets the control mode and regulates the compression ratio, the air-fuel ratio, and the boost pressure in the preset control mode. This arrangement readily ensures the good balance of the whole engine control, compared with the structure of individually changing over the settings of the compression ratio, the air-fuel ratio, and the boost pressure. The arrangement also enables the changeover conditions to be readily varied, while keeping the good balance of the whole engine control.

(3) Third Modified Example

The procedure of the embodiment discussed above controls the torque output of the engine 10 by mainly adjusting the boost pressure in the areas B and C. This is, however, not restrictive at all, and the torque output of the engine 10 may be controlled by regulating the opening of the throttle valve 52 in addition to the adjustment of the boost pressure as shown by solid lines in FIG. 12(b). This arrangement controls the torque output of the engine 10 with higher accuracy. A quick regulation of the opening of the throttle valve 52 attains a quick variation in output torque of the engine 10.

Figure 12A:
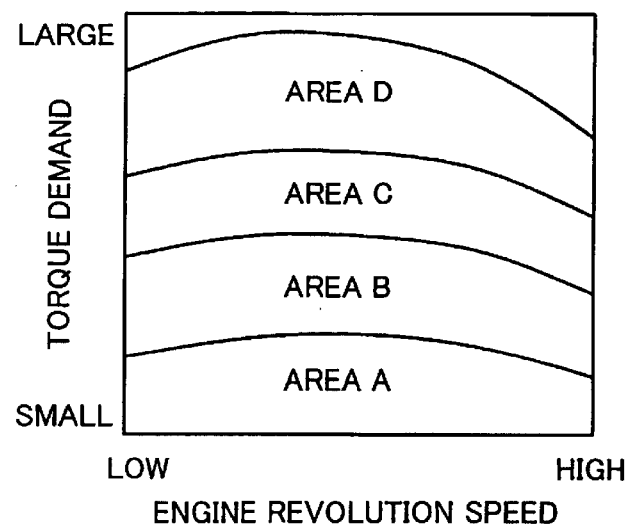
FIGS. 12(a) and 12(b) conceptually show changeover of the settings of the compression ratio, the air-fuel ratio, and the boost status in a third modified example.
Figure 12B:
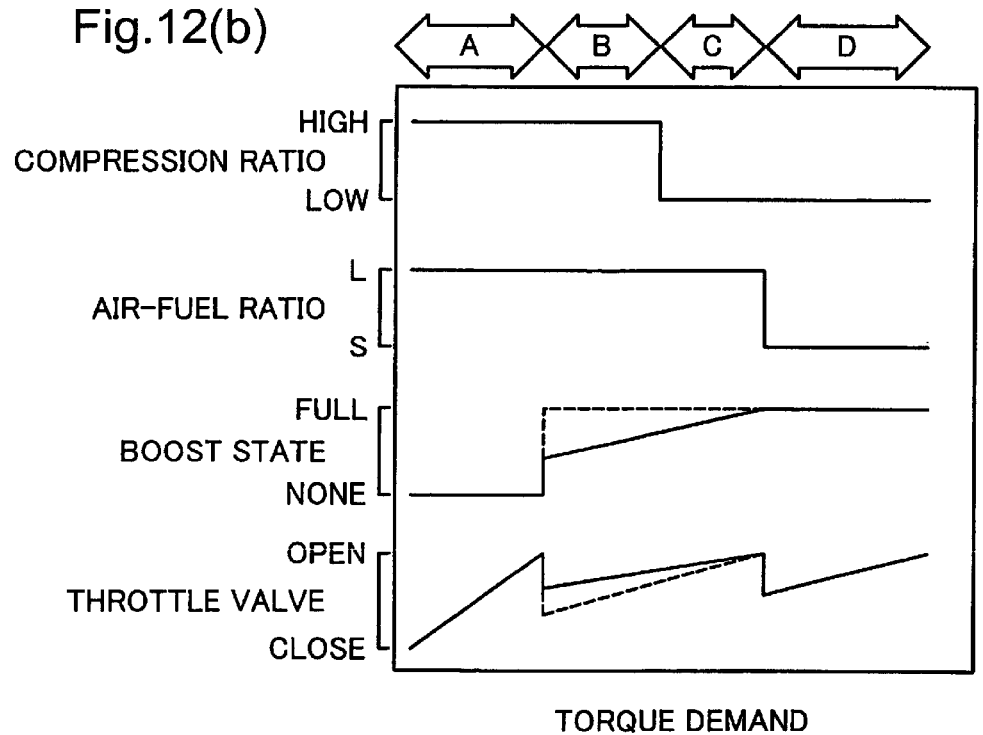

As shown by broken lines in FIG. 12(b), the torque output of the engine may be controlled by mainly regulating the opening of the throttle valve 52. This effectuates changeover of the compression ratio, the air-fuel ratio, and the boost status to the adequate settings, even when the waste gate valve 76 is not included in the booster mechanism or even when the turbine opening area is fixed. In the structure of controlling the torque output of the engine 10 through regulation of the opening of the throttle valve 52, the adjustment of the boost pressure is additionally used to control the torque output of the engine 10.

(4) Fourth Modified Example

The procedure of the embodiment discussed above shifts the driving state of the engine 10 from the settings of the area B to the settings of the area C with a variation in torque demand. In one modified structure, the driving state of the engine 10 may be shifted to the settings of the area C when the occurrence of knocking is detected in the area B by means of a knocking sensor, which continuously monitors the occurrence of knocking. In another modified structure, the driving state of the engine 10 may be shifted to the settings of the area C when the boost pressure measured by the intake pressure sensor 57 exceeds a preset level.

The embodiment discussed above and its modified examples are to be considered in all aspects as illustrative and not restrictive. There may be many other modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. An internal combustion engine that makes an air fuel mixture of the air and a fuel subjected to combustion in a combustion chamber, thereby outputting a torque to an output shaft, said internal combustion engine comprising:

a compression mechanism that compresses the air-fuel mixture;

a compression ratio changeover module that changes over a compression ratio of the air-fuel mixture compressed by said compression mechanism at least between a high compression ratio and a low compression ratio;

an air-fuel ratio changeover module that changes over an air-fuel ratio, which represents a ratio of the air to the fuel contained in the air fuel mixture, at least between a stoichiometric air-fuel ratio, at which the fuel and the air cause just enough and sufficient combustion and a lean air-fuel ratio, at which the fuel is insufficient relative to the air;

a booster module that changes over a boost status between a boosting state in which the air is pressurized and supplied to the combustion chamber and a non-boosting state in which the air is supplied to the combustion chamber without pressurization;

a detection module that detects a torque demand, which is currently required to said internal combustion engine; and a control module that varies a target control area, which corresponds to current settings of said compression ratio changeover module, said air-fuel ratio changeover module, and said booster module, according to the detected torque demand and controls said internal combustion engine, wherein said control module storing multiple control areas as options of the target control area, the multiple control areas including:

a first control area, which controls torque output with settings of the high compression ratio, the lean air-fuel ratio, and the non-boosting state;

a second control area, which is provided to have higher torques than the first control area and controls the torque output with settings of the high compression ratio, the lean air-fuel ratio, and the boosting state;

a third control area, which is provided to have higher torques than the second control area and controls the torque output with settings of the low compression ratio, the lean air-fuel ratio, and the boosting state; and a fourth control area, which is provided to have higher torques than the third control area and controls the torque output with settings of the low compression ratio, the stoichiometric air-fuel ratio, and the boosting state.

2. An internal combustion engine in accordance with claim 1, wherein said control module controls the output torque by varying a boost pressure inside the second control area.

3. An internal combustion engine in accordance with claim 1, wherein said control module controls the output torque by varying a boost pressure at the low compression ratio inside the third control area.

4. An internal combustion engine in accordance with claim 1, wherein said control module controls the output torque by varying a boost pressure and regulates the compression ratio to a lower level with an increase in boost pressure inside the third control area.

5. An internal combustion engine that makes an air fuel mixture of the air and a fuel subjected to combustion in a combustion chamber, thereby outputting a torque to an output shaft, said internal combustion engine comprising:

a compression mechanism that compresses the air-fuel mixture;

a compression ratio changeover module that changes over a compression ratio of the air-fuel mixture compressed by said compression mechanism at least between a high compression ratio and a low compression ratio;

an air-fuel ratio changeover module that changes over an air-fuel ratio, which represents a ratio of the air to the fuel contained in the air fuel mixture, at least between a stoichiometric air-fuel ratio, at which the fuel and the air cause just enough and sufficient combustion and a lean air-fuel ratio, at which the fuel is insufficient relative to the air;

a booster module that changes over a boost status between a boosting state in which the air is pressurized and supplied to the combustion chamber and a non-boosting state in which the air is supplied to the combustion chamber without pressurization;

a detection module that detects a torque demand, which is currently required to said internal combustion engine; and a control module that varies settings of said compression ratio changeover module, said air-fuel ratio changeover module, and said booster module according to the detected torque demand and controls said internal combustion engine, and said control module controls said booster module to effectuate the boosting state to increase the output torque of said internal combustion engine, when the torque demand exceeds a preset first threshold value under settings of the high compression ratio, the lean air-fuel ratio, and the non-boosting state, wherein said booster module comprises a boost pressure regulation sub-module that regulates a boost pressure in the boosting state, said when the torque demand exceeds a preset second threshold valve, which is greater than the preset first threshold valve, under setting of the high compression ratio, the lean air-fuel ration, and the boosting state, said control module lowers compression ratio and raises the boost pressure while keeping the lean air-fuel ratio, to increase the output torque of said internal combustion engine.

6. An internal combustion engine in accordance with claim 5, wherein said control module, when the torque demand exceeds a preset third threshold value, which is greater than the preset second threshold value, under settings of the low compression ratio, the lean air-fuel ratio, and the boosting state, changes the air-fuel ratio to the stoichiometric air-fuel ratio, to increase the output torque of said internal combustion engine.

7. A control method of an internal combustion engine that compresses an air-fuel mixture of the air and a fuel in a combustion chamber and makes the compressed air-fuel mixture subjected to combustion, so as to output a torque to an output shaft, said control method comprising:

a first step of storing maps of settings of a compression ratio, an air-fuel ratio, and a boost status of the air-fuel mixture to a torque demand, which is required to said internal combustion engine;

a second step of detecting a torque demand currently required to said internal combustion engine; and a third step of varying the settings of the compression ratio, the air-fuel ratio, and the boost status of the air-fuel mixture, based on the stored maps and the detected torque demand, and controlling said internal combustion engine, wherein the maps stored in said first step include:

a first settings predetermined high compression ratio to the compression ratio, a lean air-fuel ratio, which has a lower concentration of the fuel than a stoichiometric air-fuel ratio, to the air-fuel ratio, and a non-boosting state to the boost status, when the torque demand is smaller than a preset first threshold value;

a second settings of the predetermined high compression ratio to the compression ratio, the lean air-fuel ratio to the air-fuel ratio, and a boosting state to the boost status, when the torque demand is greater than the preset first threshold value but is smaller than a preset second threshold value, where the preset second threshold value is larger than the preset first threshold value;

a third settings of a predetermined low compression ratio to the compression ratio, the lean air-fuel ratio to the air-fuel ratio, and the boosting state to the boost status, when the torque demand is greater than the preset second threshold value but is smaller than a preset third threshold value, where the preset third threshold value is larger than the preset second threshold value; and a fourth settings of the predetermined low compression ratio to the compression ratio, the stoichiometric air-fuel ratio to the air-fuel ratio, and the boosting state to the boost status, when the torque demand is greater than the preset third threshold value.

8. A control method of an internal combustion engine that compresses an air-fuel mixture of the air and a fuel in a combustion chamber and makes the compressed air-fuel mixture subjected to combustion, so as to output a torque to an output shaft, said control method comprising:

a first step of detecting a torque demand currently required to said internal combustion engine; and a second step of varying settings of a compression ratio, an air-fuel ratio, and a boost status of the air-fuel mixture according to the detected torque demand, controlling said internal combustion engine to increase the output torque of said internal combustion engine, while said internal combustion engine is under control with settings of a predetermined high compression ratio to the compression ratio, a lean air-fuel ratio, which has a lower concentration of the fuel than a stoichiometric air-fuel ratio, to the air-fuel ratio, and a non-boosting state of the air-fuel mixture to the boost status, when the detected torque demand exceeds a preset first threshold value, said second step effectuating a boosting state, and lowering the compression ratio and raising a boost pressure while keeping the lean air-fuel ration, thereby increasing the output torque of said internal combustion engine, when the detected torque demand exceeds a preset second threshold value, which is greater than the preset first threshold valve, while said internal combustion engine is under settings of the high compression ratio, the lean air-fuel ratio, and the boosting state.

* * * * *